United States Patent
Kim et al.

(10) Patent No.: US 7,266,384 B2
(45) Date of Patent: Sep. 4, 2007

(54) DSCH POWER CONTROL METHOD FOR WCDMA

(75) Inventors: Bong Hoe Kim, Kyungki-do (KR); Seung Hoon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 528 days.

(21) Appl. No.: 10/359,099

(22) Filed: Feb. 6, 2003

(65) Prior Publication Data

US 2003/0153346 A1   Aug. 14, 2003

(30) Foreign Application Priority Data

Feb. 9, 2002   (KR) .......................... 2002-0007776
Aug. 10, 2002   (KR) .......................... 2002-0047369
Aug. 20, 2002   (KR) .......................... 2002-0049268

(51) Int. Cl.
*H04B 7/00* (2006.01)
(52) U.S. Cl. ........................................ 455/522; 455/69
(58) Field of Classification Search ................ 455/522, 455/69, 127.1, 127.5, 442, 422, 67.4, 436, 455/439, 525
See application file for complete search history.

(56) References Cited

U.S. PATENT DOCUMENTS 6,650,905 B1 *  11/2003  Toskala et al. ............. 455/522
6,868,075 B1 *  3/2005  Narvinger et al. .......... 370/335
2002/0071480 A1 *  6/2002  Marjelund et al. .......... 375/141
2002/0077141 A1 *  6/2002  Hwang et al. .............. 455/522
2002/0115460 A1 *  8/2002  Rune et al. .................. 455/522
2002/0115464 A1 *  8/2002  Hwang et al. .............. 455/522

FOREIGN PATENT DOCUMENTS

| EP | 1206047 A2 | 5/2002 |
| EP | 1207711 A2 | 5/2002 |
| EP | 1235454 A2 | 8/2002 |
| JP | 14-026808 A | 1/2002 |
| KR | 2002-0027247 A | 4/2002 |
| KR | 2002-0029143 A | 4/2002 |

* cited by examiner

*Primary Examiner*—Philip J. Sobutka
(74) *Attorney, Agent, or Firm*—Fleshner & Kim, LLP

(57) ABSTRACT

In the DSCH power control method for mobile communication system according to the present invention, the cell transmitting DSCH receives a signal from an UE, determines whether a cell transmitting DSCH to be set as primary or non-primary based on the received signal, and controls DSCH transmit power according to a result of the determination. The cell decreases DSCH transmit power when the cell is set as primary and increases DSCH transmit power when the cell is set as non-primary. In the DSCH transmit power control method of the present invention the cell transmitting DSCH sets its state as non-primary when the received signal quality is bad, such that it is possible to prevent the cell transmitting the DSCH from reducing the DSCH transmit power even when the received signal quality is bad, unlike in the typical SSDT.

13 Claims, 5 Drawing Sheets

DSCH POWER CONTROL METHOD FOR WCDMA

BACKGROUND OF THE INVENTION

1. Field of the Invention

The present invention relates to a wireless communication and, more particularly, to a method for controlling transmit power of a downlink shared channel (DSCH) in third generation mobile communication system.

2. Description of the Background Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology. In December, 1998, the ETSI of Europe, the ARIB/TTC of Japan, the T1 of the United States, and the TTA of Korea formed a Third Generation Partnership Project (3GPP) for the purpose of creating the specification for standardizing the UMTS.

The work towards standardizing the UMTS performed by the 3GPP has resulted in the formation of five technical specification groups (TSG), each of which is directed to forming network elements having independent operations. More specifically, each TSG develops, approves, and manages a standard specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

The TSG-RAN group includes a plenary group and four working groups. Working group 1 (WG1) develops a specification for a physical layer (a first layer). Working group 2 (WG2) specifies the functions of a data link layer (a second layer) and a network layer (a third layer). Working group 3 (WG3) defines a specification for an interface among a base station in the UTRAN, a radio network controller (RNC), and a core network. Finally, Working group 4 (WG4) discusses requirements desired for evaluation of radio link performance and items desired for radio resource management.

FIG. 1 shows a structure of a 3GPP UTRAN. This UTRAN 110 includes one or more radio network subsystems (RNS) 120 and 130. Each RNS 120 and 130 includes a RNC 121 and 131 and one or more Nodes B 122 and 123 and 132 and 133 (e.g., a base station) managed by the RNCs. RNCs 121 and 131 are connected to a mobile switching center (MSC) 141 which performs circuit switched communications with the GSM network. The RNCs are also connected to a serving general packet radio service support node (SGSN) 142 which performs packet switched communications with a general packet radio service (GPRS) network.

Node Bs are managed by the RNCs, receive information sent by the physical layer of a terminal 150 (e.g., mobile station, user equipment and/or subscriber unit) through an uplink, and transmit data to a terminal 150 through a downlink. Nodes B, thus, operate as access points of the UTRAN for terminal 150.

The RNCs perform functions which include assigning and managing radio resources. An RNC that directly manages a Node B is referred to as a control RNC (CRNC). The CRNC manages common radio resources. A serving RNC (SRNC), on the other hand, manages dedicated radio resources assigned to the respective terminals. The CRNC can be the same as the SRNC. However, when the terminal deviates from the region of the SRNC and moves to the region of another RNC, the CRNC can be different from the SRNC. Because the physical positions of various elements in the UMTS network can vary, an interface for connecting the elements is necessary. Nodes B and the RNCs are connected to each other by an Iub interface. Two RNCs are connected to each other by an Iur interface. An interface between the RNC and a core network is referred to as Iu.

FIG. 2 shows a structure of a radio access interface protocol between a terminal which operates based on a 3GPP RAN specification and a UTRAN. The radio access interface protocol is horizontally formed of a physical layer (PHY), a data link layer, and a network layer and is vertically divided into a control plane for transmitting control information and a user plane for transmitting data information. The user plane is a region to which traffic information of a user such as voice or an IP packet is transmitted. The control plane is a region to which control information such as an interface of a network or maintenance and management of a call is transmitted.

In FIG. 2, protocol layers can be divided into a first layer (L1), a second layer (L2), and a third layer (L3) based on three lower layers of an open system interconnection (OSI) standard model well known in a communication system.

The first layer (L1) operates as a physical (PHY) layer for a radio interface and is connected to an upper medium access control (MAC) layer through one or more transport channels. The physical layer transmits data delivered to the physical (PHY) layer through a transport channel to a receiver using various coding and modulating methods suitable for radio circumstances. The transport channel between the PHY layer and the MAC layer is divided into a dedicated transport channel and a common transport channel based on whether it is exclusively used by a single terminal or shared by several terminals.

The second layer L2 operates as a data link layer and lets various terminals share the radio resources of a W-CDMA network. The second layer L2 is divided into the MAC layer, a radio link control (RLC) layer, a packet data convergence protocol (PDCP) layer, and a broadcast/multicast control (BMC) layer.

The MAC layer delivers data through an appropriate mapping relationship between a logical channel and a transport channel. The logical channels connect an upper layer to the MAC layer. Various logical channels are provided according to the kind of transmitted information. In general, when information of the control plane is transmitted, a control channel is used. When information of the user plane is transmitted, a traffic channel is used. The MAC layer is divided two sub-layers according to performed functions. The two sub-layers are a MAC-d sub-layer that is positioned in the SRNC and manages the dedicated transport channel and a MAC-c/sh sub-layer that is positioned in the CRNC and manages the common transport channel.

The RLC layer forms an appropriate RLC protocol data unit (PDU) suitable for transmission by the segmentation and concatenation functions of an RLC service data unit (SDU) received from an upper layer. The RLC layer also performs an automatic repeat request (ARQ) function by which an RLC PDU lost during transmission is re-transmitted. The RLC layer operates in three modes, a transparent mode (TM), an unacknowledged mode (UM), and an acknowledged mode (AM). The mode selected depends upon the method used to process the RLC SDU received from the upper layer. An RLC buffer stores the RLC SDUs or the RLC PDUs received from the upper layer exists in the RLC layer.

The packet data convergence protocol (PDCP) layer is an upper layer of the RLC layer which allows data items to be transmitted through a network protocol such as the IPv4 or the IPv6. A header compression technique for compressing and transmitting the header information in a packet can be used for effective transmission of the IP packet.

The broadcast/multicast control (BMC) layer allows a message to be transmitted from a cell broadcast center (CBC) through the radio interface. The main function of the BMC layer is scheduling and transmitting a cell broadcast message to a terminal. In general, data is transmitted through the RLC layer operating in the unacknowledged mode.

The PDCP layer and the BMC layer are connected to the SGSN because a packet switching method is used, and are located only in the user plane because they transmit only user data. Unlike the PDCP layer and the BMC layer, the RLC layer can be included in the user plane and the control plane according to a layer connected to the upper layer. When the RLC layer belongs to the control plane, data is received from a radio resource control (RRC) layer. In the other cases, the RLC layer belongs to the user plane. In general, the transmission service of user data provided from the user plane to the upper layer by the second layer (L2) is referred to as a radio bearer (RB). The transmission service of control information provided from the control plane to the upper layer by the second layer (L2) is referred to as a signaling radio bearer (SRB). As shown in FIG. 2, a plurality of entities can exist in the RLC and PDCP layers. This is because a terminal has a plurality of RBs, and one or two RLC entities and only one PDCP entity are generally used for one RB. The entities of the RLC layer and the PDCP layer can perform an independent function in each layer.

The RRC layer positioned in the lowest portion of the third layer (L3) is defined only in the control plane and controls the logical channels, the transport channels, and the physical channels in relation to the setup, the reconfiguration, and the release of the RBs. At this time, setting up the RB means processes of stipulating the characteristics of a protocol layer and a channel, which are required for providing a specific service, and setting the respective detailed parameters and operation methods. It is possible to transmit control messages received from the upper layer through a RRC message.

Transport channels are services offered by the Layer 1 to the higher layers. A transport channel is defined by how and with what characteristics data is transferred over the air interface. The transport channels can be classified into Dedicated channels and Common channels. There exists only one type of dedicated transport channel, the Dedicated Channel (DCH). On the other hand, there are six types of common transport channels, i.e., Broadcast Channel (BCH), Forward Access Channel (FACH), Paging Channel (PCH), Random Access Channel (RACH), Common Packet Channel (CPCH), and Downlink Shared Channel (DSCH).

Among them DSCH is a downlink transport channel shared by several UEs. The DSCH is associated with one or several downlink DCH and is transmitted over the entire cell or over only a part of the cell using beamforming antennas.

FIG. 3 shows frame structure for downlink shared channel (DSCH). As shown in FIG. 3, each frame has a length of 10 ms and is split into 15 slots. Each of the slots has a length $T_{slot}$=2560 chips.

A DSCH is shared by several UEs through time division scheduling which is carried out at the single frame level (10 ms) or over several frames. Thus, DSCH enables multiple UEs with relatively low activity and bursty traffic to share a high data rate channel employing a common channelization code resource.

The primary way of sharing the channelization code resource is to allocate the code resource to a single UE at a time in the time domain. Despite this, a limited degree of code multiplexing, i.e, more than one user transmitting DSCH data at the same time using distinct parts of the set of codes allocated for the DSCH, is useful to increase the granularity in supported payload sizes. In other words, DSCH is a code multiplexed and time multiplexed channel. Accordingly, power control for the DSCH is performed in associated with the UEs occupied the DSCH.

The UEs are identified by root channelization codes of spreading factor allocated to the DSCH. For example, when the spreading factor (SF) of DSCH are 4, 8, 16, 32, and 64, there are respective 4, 8, 16, 32, and 64 root channelization codes. The high rate channelization code is generated by splitting low rate channelization code.

The DSCH is associated with one or several downlink DCH. That is, the UE occupied DSCH has one DCH. In view of power control, UE measures the power level of the DCH transmitted from the base station, generates a transmit power control (TPC) command based on the measured power level, and transmits the TPC to the base station. The base station adjusts the power level of the DCH according to the TPC received from the UE. Also, the base station can updates the power level of the DSCH in association with the DCH without additional TPC for DSCH. The reason why the power level of the DSCH is associated of the power level of DCH is because the DSCH is shared by several UEs and can be occupied by only one UE. The DCH is allocated per UE occupying the DSCH for periodically transmitting Pilot for Fast Power Control and transmitting control information on the DSCH, which is called an associated DCH.

Since the DSCH is associated with the DCH, the data transmission from the base station to UEs via the DSCH can be performed. Each UE to which data can be transmitted on the DSCH has an associated downlink dedicated physical channel (DPCH). The associated downlink DPCH is used to carry control commands for the associated uplink DPCH and, if needed, other services, e.g., circuit-switched voice.

FIG. 4 shows a frame structure for downlink DPCH. As explained above, DCH is a transport channel between the PHY layer and the MAC layer, and the DPCH is a physical channel between a transmitter and receiver.

As shown in FIG. 4, each frame has a length of 10 ms and is split into 15 slots (slot#0~slot#14). Each slot has a length $T_{slot}$=2560 chips, corresponding to one power control period. Within one downlink DPCH, dedicated data generated at Layer 2 and above, i.e., the dedicated transport channel (DCH), is transmitted in time multiplex with control information generated at Layer 1, i.e., pilot bits, TPC commands, and an optional TFCI. The downlink DPCH can thus be seen as a time multiplex of a downlink Dedicated Physical Data Channel (DPDCH) and a downlink Dedicated Physical Control Channel (DPCCH). In FIG. 5, the parameter k determines the total number of bits per downlink DPCH slot. It is related to the spreading factor (SF) of the physical channel as SF=$512/2^k$. Thus the SF ranges form 512 to 4. The number of bits of the downlink DPCH fields ($N_{data1}$, $N_{TPC}$, $N_{TFCI}$, $N_{data2}$, $N_{pilot}$) varies according to a slot format to used. The Transport Format Combination Indicator (TFCI) field includes channel quality information such as data rate and coding scheme of the associated channel.

In case that data for one UE is transmitted on the DSCH, the channel information of the DSCH should be transmitted as well as that of the DCH through TFCI filed of the DPCCH. For this reason, the TFCI field per slot may be divided into two parts, one for the DCH and the other for the DSCH.

There are two methods for encoding the information on the DCH and DSCH. The first method is to encode the TFCI information of the DCH and DSCH into one codeword using the second order Reed-Muller coding, which is called Logical Split Mode.

The second method is to encode the TFCI information of the DCH and TFCI information of the DSCH into respective two codewords using the first order Reed-Muller coding and scramble the bits of the codewords, which is called Hard Split Mode.

The second TFCI coding method can be used in case that the DCHs are transmitted from different RNCs. That is, the second TFCI coding method supports the transmission of TFCI information of the DSCH from some of RNCs.

The TPC of DPCCH is a transmit power control command for controlling transmit power of the uplink channel such that the UE adjust the transmit power according to the TPC. The associated channel condition is measured using the pilot field.

The problem comes from the fact that DCH may be in soft handover and the DSCH is not because the DSCH is shared several UEs in time domain in one cell. That is, only one cell can communicate with one UE through the DSCH such that if the UE moves to a new cell it should occupy the DSCH of the associated cell. Accordingly, in case that the DCH is in the soft handover state, i.e. connected to more than one cell and DSCH is connected to one base station, another power control method is required.

Unlike the DCH for which the UE generates TPC of the uplink DPCCH based on the sum of the powers transmitted from plural cells, the DSCH can be provided by only one cell such that it is difficult to expect reliable power control of the DSCH based on the TPC associated with the DCH.

The 3GPP standard specifies a Site Selection Diversity Transmit (SSDT) signaling as another macro diversity method in soft handover mode. This method is optional in UTRAN.

The SSDT operates in such a way that the UE selects one of the cells from its active set to be 'primary', all other cells are classed as 'non-primary.' In order to select a primary cell, each cell is assigned a temporary identification (ID) and UE periodically informs a primary cell ID to the connecting cells. The non-primary cells selected by UE switch off the transmission power. The primary cell ID is delivered by UE to the active set via uplink FBI field SSDT activation, SSDT termination and ID assignment are all carried out by higher layer signaling.

In SSDT, to avoid the channel is broken due to failure of primary cell selection when the channel quality is bad, conditions for being a non-primary cell is critical.

The UE periodically sends the primary cell ID code via portion of the uplink FBI field assigned for SSDT use. A cell recognizes its state as non-primary if the following conditions are fulfilled simultaneously:

(1) The received ID code does not match with the own ID code.

(2) The received uplink signal quality satisfies a quality threshold, Qth, a parameter defined by the network.

(3) If uplink compressed mode is used, and less than $N_{ID}/3$ bits are lost from the ID code (as a result of uplink compressed mode), where $N_{ID}$ is the number of bits in the ID code (after puncturing if puncturing has been done).

Otherwise the cell recognizes its state as primary.

In SSDT, only the primary cell transmits DPDCH. Since the cell of which ID code is identical with the primary cell ID code transmitted by the UE is set as a primary cell, DPDCH is not transmitted to the UE when the channel quality is so bad that the cell to be primary fails to recognize its state as primary. To avoid this situation, the conditions for being non-primary cell is very critical.

Also, SSDT is used for transmit power control of the DSCH. In this case, the cell, in the active set, transmitting DSCH decodes the primary cell ID code transmitted from the UE so as to determine whether it is primary or non-primary, while the other cells in the active set does not activate SSDT. The cell set its state as primary reduces the DSCH transmit power as much as an power offset for the primary cell.

In SSDT, the cell may recognize its state as primary in two situations, i.e., when the uplink channel quality is good so as to recognize its state based on the primary cell ID code transmitted by the UE and when the channel quality is bad so as not to rely on the primary cell ID code due to decoding performance degradation. In the latter situation, the cell transmitting DSCH sets its state as primary regardless of the primary cell ID code for overcoming shortage of the SSDT, i.e., all of the cells become non-primary.

However, the above DSCH power control using SSDT has a drawback in that since the cell transmitting DSCH sets its state as primary and reduces DSCH transmit power even when the channel quality is bad, resulting in degradation of DSCH performance.

SUMMARY OF THE INVENTION

The present invention has been made in an effort to solve the above problems.

It is an object of the present invention to provide a DSCH power control method capable of preventing the cell transmitting DSCH from setting its status as primary regardless of the primary cell ID code transmitted by the UE when the uplink channel quality is bad.

It is another object of the present invention to provide a DSCH power control method capable of efficiently controlling the DSCH transmit power by modifying conditions for setting a cell as primary to be more critical.

To achieve the above objects, the DSCH power control method according to the present invention includes the steps of: (a) receiving a signal from an UE, (b) determining whether a cell transmitting DSCH to be set as primary or non-primary based on the received signal, and (c) adjusting DSCH transmit power according to a result of the determination.

In one aspect of the present invention, the cell determines whether or not a received signal quality is greater than a quality threshold (Qth) so as to set its state as non-primary when the received signal quality is not greater than the quality threshold. On the other hand when the received signal quality is greater than the quality threshold, the cell determines whether or not a primary cell ID code contained in the received signal matches with a cell ID code of the cell so as to set its state as non-primary when the cell ID code does not match with the primary cell ID code and set its state as primary when the cell ID code matches with the primary cell ID code.

In another aspect of the present invention, the cell further determines whether the received signal is encoded in a normal or compressed mode when the cell ID code matches with the primary cell ID code so as to set the cell as primary when the received signal is encoded in the normal mode and determines whether or not bits punctured from number of bits ($N_{ID}$) of the primary cell ID code is less than $N_{ID}/3$ when the received signal is encoded in the compressed mode. The cell sets its state as non-primary when the bits punctured from number of bits ($N_{ID}$) of the cell ID code is greater than or equal to $N_{ID}/3$ and as non-primary when the bits punctured from number of bits ($N_{ID}$) of the cell ID code is less than $N_{ID}/3$.

In another aspect of the present invention, the cell firstly determines whether or not a primary cell ID code contained in the received signal matches with a primary cell ID code of the cell so as to set its state as non-primary when the cell ID code does not match with the primary cell ID code and as primary when the cell ID code matches with the primary cell ID code. The cell further determines whether the received signal is encoded in a normal or compressed mode when the primary cell ID code match with the cell ID code, such that the cell sets its state as primary when the received signal is encoded in the normal mode and determines whether or not bits punctured from number of bits ($N_{ID}$) of the cell ID code is less than $N_{ID}/3$ when the received signal is encoded in the compressed mode. Sequentially, the cell sets its as non-primary when the bits punctured from number of bits ($N_{ID}$) of the cell ID code is greater than or equal to $N_{ID}/3$ and as non-primary when the bits punctured from number of bits ($N_{ID}$) of the cell ID code is less than $N_{ID}/3$.

In still another aspect of the present invention, the cell firstly determines whether the received signal is encoded in a normal or compressed mode so as to perform a normal mode pressures when the received signal is encoded normal mode and a compressed mode procedures according to a result of the determination. In the normal mode procedure, the cell determines whether or nor a primary cell ID code contained in the received signal matches with a cell ID code of the cell so as to set the cell as primary when the primary cell ID code matches with the primary cell ID code and as non-primary when the primary cell ID code does not match with the primary cell ID code. In the compressed procedure, the cell determines whether or not bits punctured from number of bits ($N_{ID}$) of the primary cell ID code is less than $N_{ID}/3$ so as to set its state as non-primary when the bits punctured from the number of bits ($N_{ID}$) of the primary cell ID code is greater than or equal to $N_{ID}/3$ and determines whether or nor a primary cell ID code contained in the received signal matches with a cell ID code of the cell when the bits punctured from number of bits ($N_{ID}$) of the primary cell ID code is less than $N_{ID}/3$. Sequentially, the cell sets its as primary when the primary cell ID code matches with the primary cell ID code and as non-primary when the primary cell ID code does not match with the primary cell ID code.

In the DSCH power control method of the present invention, the cell decreases DSCH transmit power when the cell is set as primary and increase DSCH transmit power when the cell is set as non-primary.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention will be described hereinafter with reference to the accompanying drawings.

In the present invention, a primary cell is determined using the SSDT uplink signaling. To control the DSCH transmit power a primary cell is firstly selected from an active set of associated UE. In order to select a primary cell, each cell is assigned a temporary identification (ID) and UE periodically informs a primary cell ID to the connecting cells via portion of the uplink FBI field assigned for SSDT use. A cell recognizes its state as primary when the received ID code from the UE matches with its own ID code.

The primary cell selection is performed in consideration of the transmit power level of the UE. When the received signal quality is less than a predetermined level, errors may occur while decoding the received signal. In this case the cell transmitting DSCH sets its state as non-primary unlike the typical SSDT procedure in which the cell maintain its state as primary.

Figure 1:
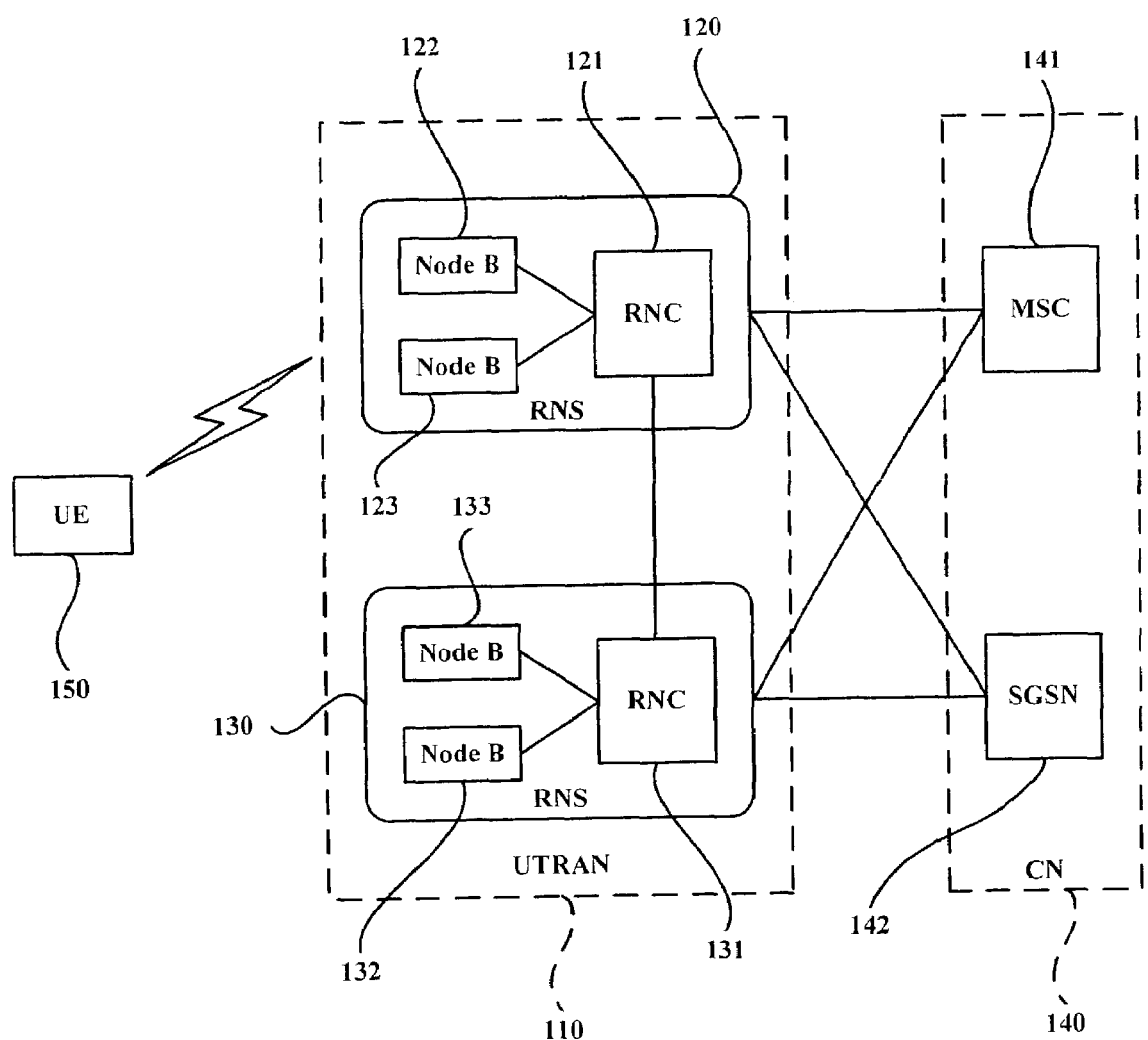
FIG. 1 is a conceptual view showing a structure of a UMTS radio access network (UTRAN) of a 3GPP.
Figure 2:
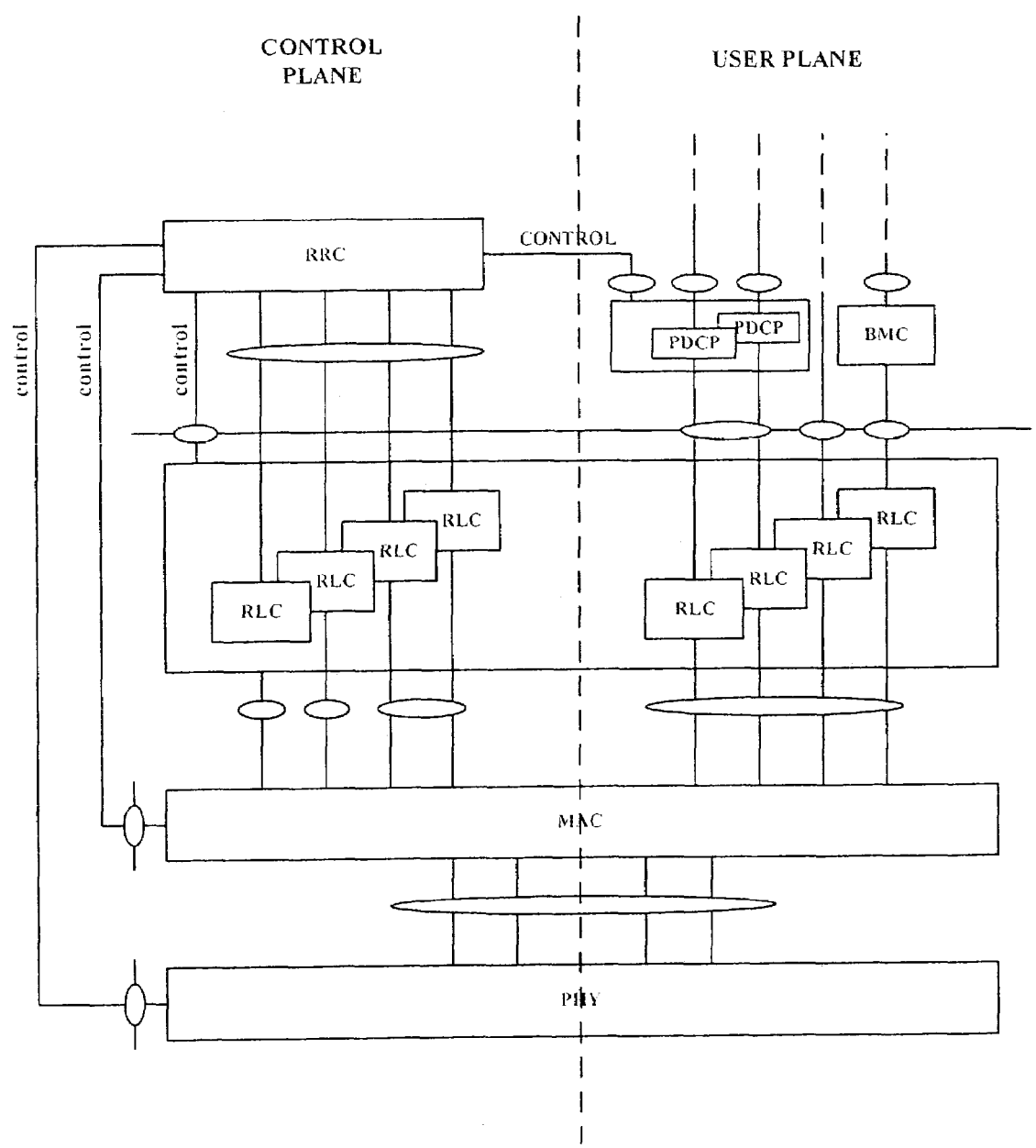
FIG. 2 is a conceptual view for showing a protocol structure of a radio interface adapted to the UTRAN of FIG. 1.
Figure 3:
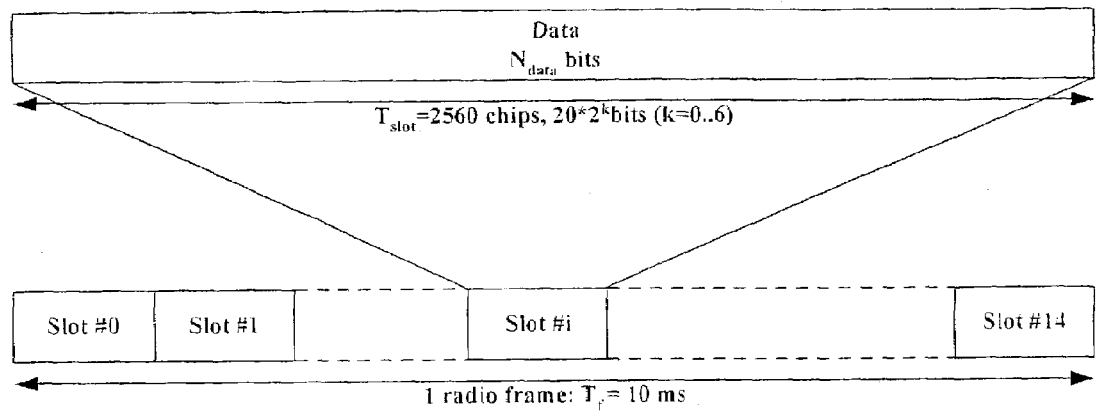
FIG. 3 is a drawing illustrating frame structure for downlink shared channel (DSCH)
Figure 4:
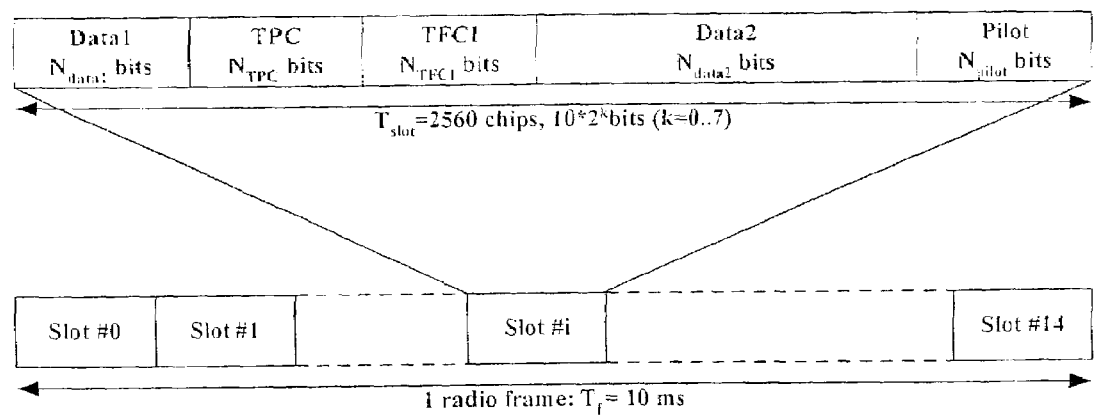
FIG. 4 is a drawing illustrating frame structure for downlink dedicated physical channel (DPCH)
Figure 5:
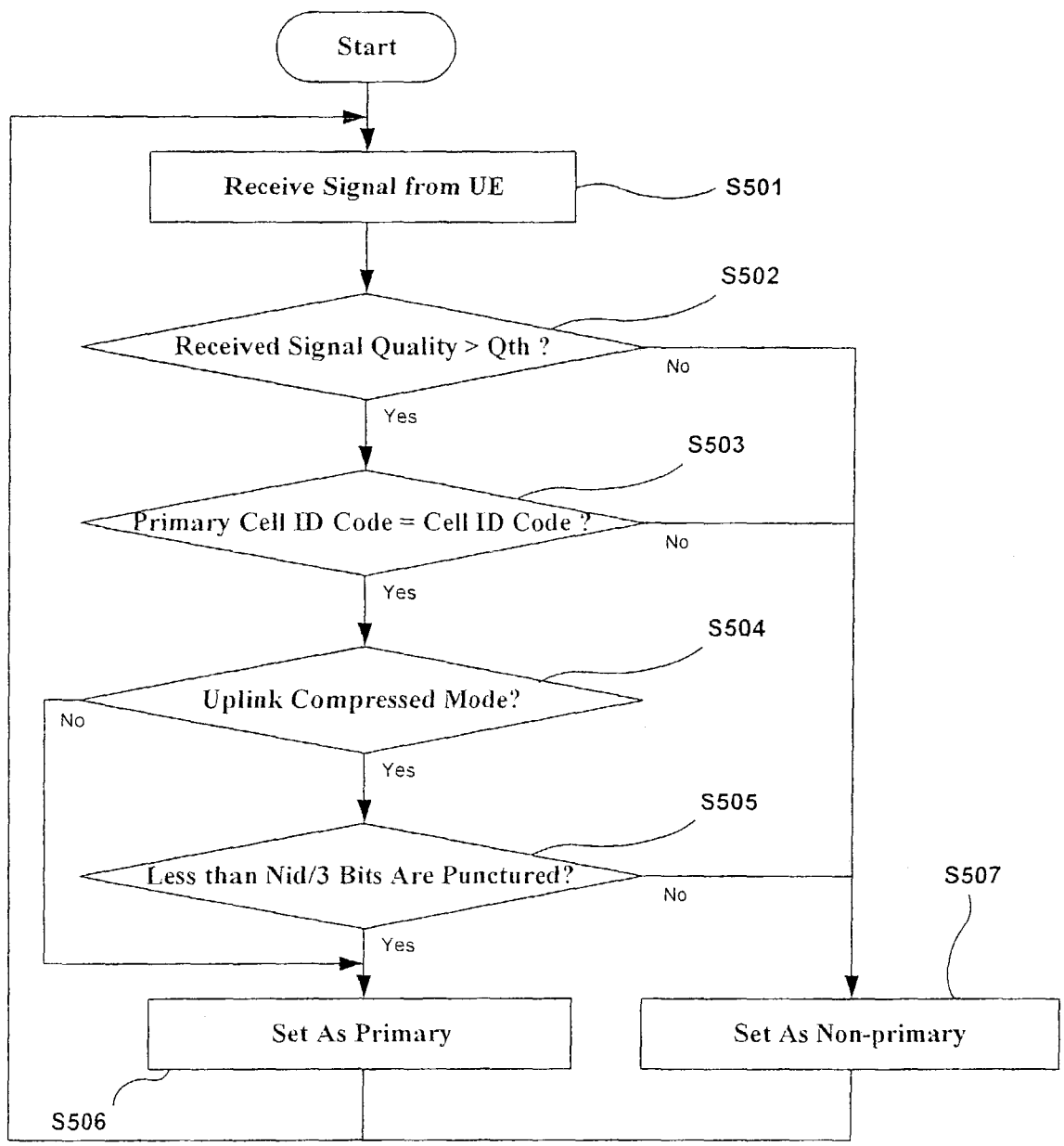
FIG. 5 is a flowchart illustrating a DSCH power control method according to a first embodiment of the present invention.

FIG. 5 is a flowchart illustrating a method for controlling the DSCH transmit power according to a first embodiment of the present invention.

In FIG. 5, once the cell transmitting DSCH receives signal from a UE at step S501, the cell determines whether or not the received uplink signal quality is greater than or equal to an uplink quality threshold (Qth) at step S502. If the received signal quality is greater than or equal to the uplink quality threshold, the cell determines whether or not its own ID code matches with a primary cell ID code transmitted by the UE at step S503. If the cell ID code matches with the primary cell ID code, the cell determines whether or not an uplink compressed mode is used at step S504. If the uplink compressed mode is used, the cell determines whether or not less than [$N_{ID}/3$] bits are punctured from the ID code, where $N_{ID}$ is the number of bits in the cell ID code, at step S505. If less than [$N_{ID}/3$] bits are punctured, the cell sets its state as primary at step S506 and the algorithm returns to step S501. At step S504, if it is determined that the uplink compressed mode is not used, the cell sets its state as primary with skipping the step S505.

On the other hand, if the received signal quality is less than the uplink quality threshold (Qth) at step S502, if the cell ID code does not match with the primary cell ID code from the UE at step S503, or more than or equal to [$N_{ID}/3$] bits are punctured from the primary cell ID code, the cell sets its state as non-primary at step S507 and the algorithm returns to step S501.

The received uplink signal quality can be ignored because whether or not the primary cell exists is not important for DSCH power control. In this case the cell sets it state as primary when the two conditions are satisfied, i.e., when the cell ID code matches with the primary cell ID code and less than [$N_{ID}/3$] bits are punctured from the ID code in the uplink compressed mode.

Figure 6:
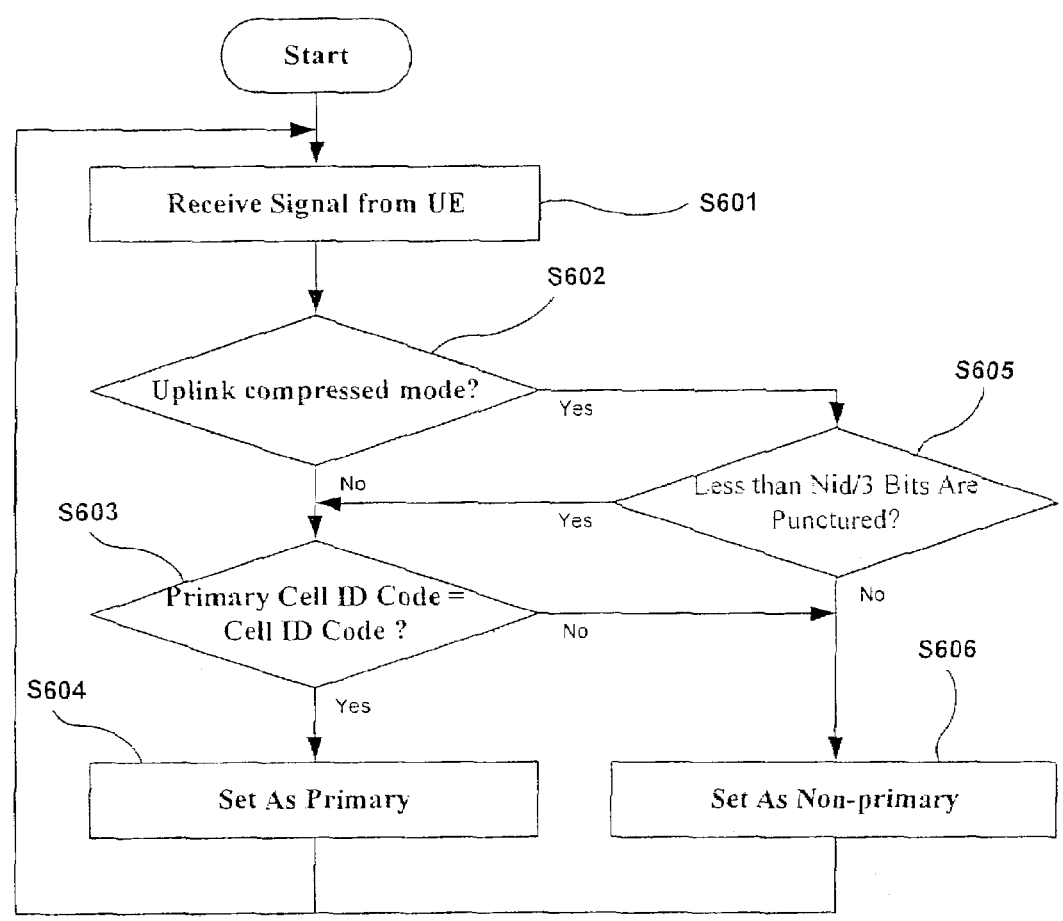
FIG. 6 is a flowchart illustrating a DSCH power control method according to a second embodiment of the present invention.

FIG. 6 is a flowchart illustrating a method for controlling the DSCH transmit power according to a second embodiment of the present invention.

In FIG. 6, once the cell transmitting DSCH receives signal from a UE at step S601, the cell determines whether or not the uplink compressed mode is used at step S602. If the uplink compressed mode is not used, the cell determines whether or not its own cell ID code matches with the primary cell ID code received from the UE at step S603. Consequently, the cells its state as primary at step S604 if the cell ID code matches with the primary cell ID code and set its state as non-primary at step S606 if the cell ID code does not matches with the primary cell ID code.

On the other hand, at step S602 if it is determined that the uplink compressed mode is used, the cell determines whether or not less than [$N_{ID}/3$] bits are punctured from the ID code at step S605. If it is determined that less than [$N_{ID}/3$] bits are punctured from the ID code, the cell performing the step S603. If it is determined that greater than or equal to [$N_{ID}/3$] bits are punctured from the ID code, the cell sets its state as non-primary at step S606.

Once the cell transmitting DSCH sets its state as primary in accordance with the methods of the first and second embodiments, the cell decreases DSCH transmit power as much as a predetermined power offset for the primary cell. That the primary cell is selected means that the uplink channel quality is good.

On the other hand, when the cell transmitting DSCH is set as non-primary one, the cell increases DSCH transmit power by adding a predetermined power offset to the TFCI field of the DCH.

As described above, in the DSCH transmit power control method of the present invention the cell transmitting DSCH sets its state as non-primary when the received signal quality is bad, such that it is possible to prevent the cell transmitting the DSCH from reducing the DSCH transmit power even when the received signal quality is bad, unlike in the typical SSDT.

Also, since the DSCH transmit power decreases when the cell transmitting DSCH is set as primary and increases when the cell transmitting DSCH is set as non-primary in the DSCH power control method of the present invention, the DSCH transmit power is efficiently controlled according to the received signal quality.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A DSCH power control method in a mobile communication system comprising:
    (a) receiving a signal from an UE:
    (b) determining whether a cell transmitting DSCH to be a set as primary or non-primary based on the received signal; and
    (c) adjusting DSCH transmit power according to a result of the determination, wherein (b) includes,
        (1) determining whether or not a primary cell ID code contained in the received signal matches a cell ID code of the cell, and setting the cell as primary if the cell ID code matches the primary cell ID code,
        (2) if the cell ID code matches the primary cell ID code, determining whether the received signal is encoded in normal mode or compressed mode, and if the received signal is encoded in the compressed mode, determining whether or not the number of bits punctured from the total number of bits $N_{ID}$ in the primary cell ID code is less than $N_{ID}/3$, and setting the cell as primary when the number of punctured bits is not greater than $N_{ID}/3$, and in all other situations, setting the cell as non-primary.

2. The DSCH power control method of claim 1, wherein (c) includes:
    decreasing DSCH transmit power when the cell is set as primary; and
    increasing DSCH transmit power when the cell is set as non-primary.

3. The DSCH power control method of claim 1, wherein (c) includes:
    performing power control by assigning different DSCH power offset values according to whether the cell that transmits the DSCH is primary or non-primary.

4. The DSCH power control method of claim 3, wherein (c) includes:
    decreasing DSCH transmit power when the cell is set as primary; and
    increasing DSCH transmit power when the cell is set as non-primary.

5. A power control method for a downlink shared channel of a mobile communication system, the method comprising:
    receiving a signal from a user equipment;
    making a determination as to whether a cell transmitting a downlink shared channnel should be set as primary or non-primary by using a procedure of,
    comparing a cell ID code of the cell with a primary cell ID code of the received signal,
    determining whether the received signal is encoded in a normal mode or a compressed mode, and
    finding a total number of bits that are punctured from the primary cell ID code of the received signal, performed in any sequential order until the determination can be made: and
    adjusting a transmit power of the downlink shared channel according to the cell being set as primary or non-primary.

6. The method of claim 5, wherein the cell is set as non-primary,
    if the cell ID code does not match the primary cell ID code, or
    if the received signal is encoded in compressed mode and less than $N_{ID}/3$ bits are punctured from the primary cell ID code, where $N_{ID}$ is a total number of bits in the primary cell ID code.

7. The method of claim 6, wherein the cell is set as primary if otherwise.

8. The method of claim 7, wherein the transmit power is increased if the cell is set as primary and is decreased if the cell is set as non-primary.

9. The method of claim 6, wherein Site Selection Diversity Transmit signaling is used for transmit power control of the downlink shared channel.

10. A power control method for a downlink shared channel of a mobile communication system, the method comprising:
    receiving a signal from a user equipment;
    recognizing a cell that transmits a downlink shared channel as having non-primary status,
    if a primary cell ID code of the received signal does not match an ID code of the cell, and if an uplink compressed mode is used and less than $N_{ID}/3$ bits are punctured from the primary cell ID code, where $N_{ID}$ is a total number of bits in the primary cell ID code, otherwise, recognizing the cell as having primary status; and adjusting a transmit power of the downlink shared channel according to the primary or non-primary status of the cell.

11. The method of claim 10, wherein the transmit power is increased if the cell has primary status and is decreased if the cell has non-primary status.

12. The method of claim 10, wherein Site Selection Diversity Transmit signaling is used for transmit power control of the downlink shared channel.

13. A Site Selection Diversity Transmit (SSDT) method comprising:

performing SSDT signaling to reduce diversity effects; and performing SSDT signaling to achieve Downlink Shared Channel (DSCH) power control, wherein the SSDT signaling to achieve DSCH power control comprises:

if a primary cell ID code of a received signal does not match an ID code of the cell, and if an uplink compressed mode is used and less than $N_{ID}/3$ bits are punctured from the primary cell ID code, where $N_{ID}$ is a total number of bits in the primary cell ID code, otherwise, recognizing the cell as having primary status; and performing power control by assigning different DSCH power offset values according to whether the cell is primary or non-primary.

* * * * *